United States Patent [19]

Lynch et al.

[11] Patent Number: 4,679,224
[45] Date of Patent: Jul. 7, 1987

[54] TELEPHONE LINE TESTING CIRCUIT

[75] Inventors: Daniel Lynch, Jackson; Steven B. Perry, Highlands, both of N.J.

[73] Assignee: Keptel, Inc., Ocean, N.J.

[21] Appl. No.: 803,714

[22] Filed: Dec. 2, 1985

[51] Int. Cl.⁴ .............................................. H04B 3/46
[52] U.S. Cl. ...................................... 379/26; 379/27; 379/399
[58] Field of Search ................. 179/175.3 F, 175.1 R, 179/175.3 R, 81 R, 81 B, 81 L; 324/133

[56] References Cited

U.S. PATENT DOCUMENTS

| | | | |
|---|---|---|---|
| 3,729,597 | 4/1973 | Garrett et al. | 179/175 |
| 3,941,950 | 3/1976 | Dunwoodie et al. | 179/175.3 R |
| 3,976,849 | 8/1976 | Champan | 179/172.25 |
| 4,051,333 | 9/1977 | Schomburg | 179/175.3 R |
| 4,227,055 | 10/1980 | Hanson | 179/84 VF |
| 4,413,163 | 11/1983 | Basini | 179/175.3 R |
| 4,513,176 | 4/1985 | Fostveit | 179/175.1 R |
| 4,581,494 | 4/1986 | Pickens | 179/175.3 F |

Primary Examiner—Stafford D. Schreyer
Attorney, Agent, or Firm—Kenyon & Kenyon

[57] ABSTRACT

A telephone line testing circuit for determining whether a fault exists on a telephone line entering a customer's premises or whether the fault exits in the customer's wiring and equipment. The testing circuit comprises a test switch, a polarity detector, a current detector, a dial tone detector and an indicator. The polarity, current and dial tone of an incoming telephone line signal are tested sequentially in the same circuit and in one operation such that if any one of the three characteristics of the entering telephone line contains a fault, the indicator will not generate a signal. When the entering telephone line signal has the correct operating polarity, sufficient operating current draw and a dial tone of the correct operating frequency, the indicator will generate a signal indicating that no fault exits on the entering telephone line.

27 Claims, 2 Drawing Figures

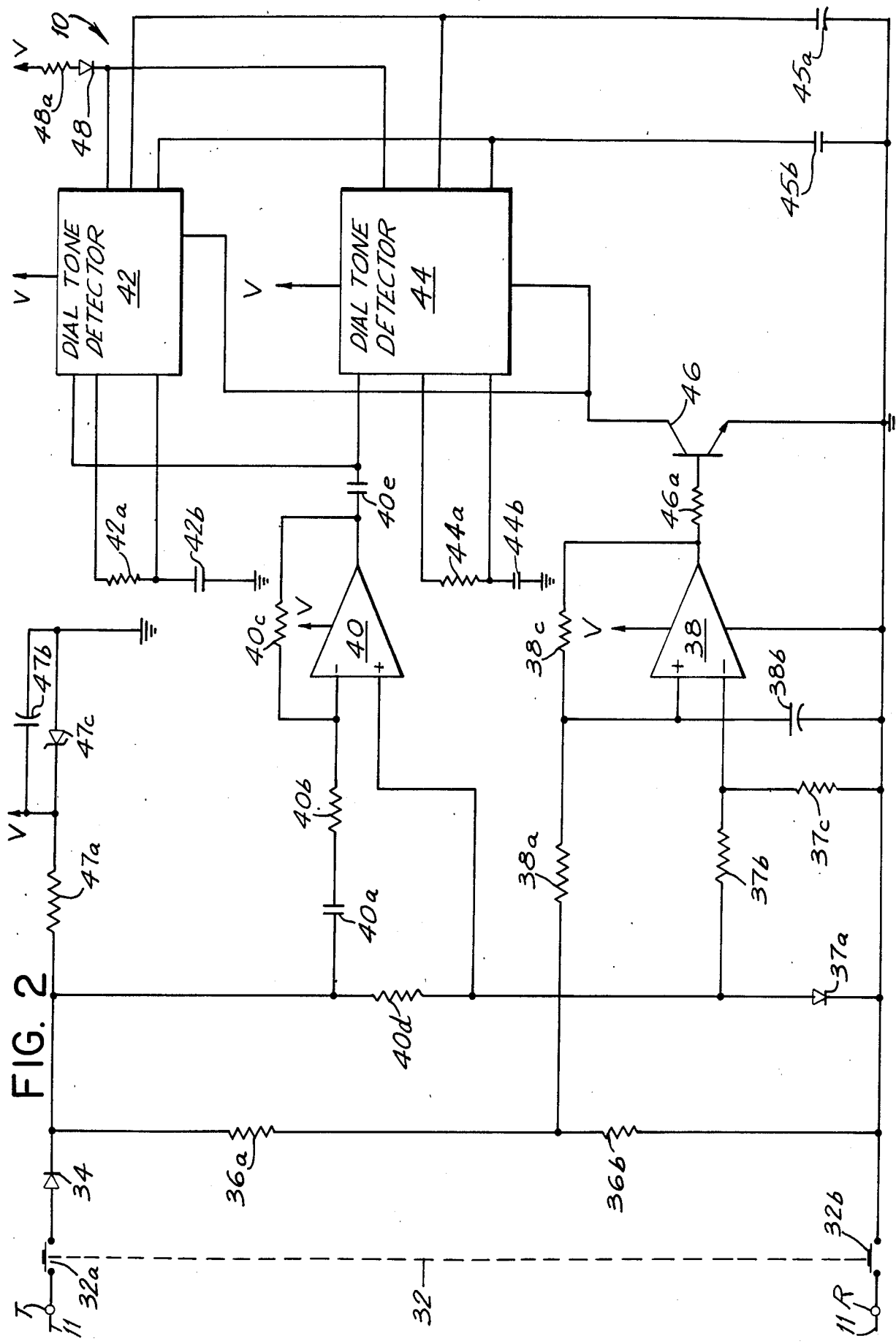

TELEPHONE LINE TESTING CIRCUIT

TECHNICAL BACKGROUND

This invention relates generally to telephone line testing devices. More particularly, the invention relates to a telephone line testing circuit for determining whether a fault exists on a telephone line entering the user's premises or in the user's wiring or equipment.

BACKGROUND OF THE INVENTION

In the past, telephone equipment and wiring in a user's home has been the property of the local telephone company. The local telephone company thus had the sole responsibility for making repairs whenever a failure of either the incoming service or the premises equipment/wiring occurred. The current trend, given impetus by the deregulation of the telecommunications industry, is toward the user owning the telephone wiring and equipment that is in his home. In such circumstances, the responsibility for detecting and making repairs to the premises equipment/wiring has now shifted from the local telephone company to the user himself. This creates a two-fold problem for the user because he has no way of determining whether a source of trouble is within the telephone equipment and wiring within his home or whether it is caused by the telephone line entering his home and, secondly, the use of the local telephone company repairman merely to detect the source of trouble usually results in a substantial fee required to be paid by the user for the service call. As a consequence, there exists a need for an apparatus or device that can be used by the user himself for determining whether a fault is in his own equipment/wiring or that of the local telephone company.

One test device that is adapted to be used by a telephone company customer in his own home for the above purposes is described in U.S. Pat. No. 4,513,176. The patent discloses a test device which is incorporated in the phone service close to the point where the service enters the home (e.g. the telephone company's wiring junction). The test device includes a multiple position switch and one or more test circuits connected to the switch. The switch knob is normally positioned so that the wiring junction is connected to the customer's wiring and telephone instruments and, as long as there is no trouble with the service, the switch will remain in this position. Whenever a fault occurs, the switch can be moved to any of its test circuit positions, thus disconnecting the customer's telephone instruments from the wiring junction and connecting the particular test circuit to that junction. The test circuits can include (1) a circuit for testing telephone line continuity from the wiring junction back to the telephone company central office, (2) a circuit for determining whether or not the telephone company's bell ringing voltage is being received at the wiring junction, (3) a circuit for determining whether or not the telephone company's dial tone is being received at the wiring junction, and (4) a circuit to provide a noise test.

Another telephone line testing device is described in U.S. Pat. No. 3,976,849. The invention of the patent relates to a portable testing unit that can be employed in testing the wire connections for a telephone handset of the type employing a multiple-conductor plug received in a mating jack in the handset for connecting the handset to the telephone lines. The portable testing unit checks for the presence of a minimum voltage of the correct polarity between the tip and ring line conductors of a telephone installation and also simultaneously checks for the presence of a proper A.C. lamp voltage between ground and the lamp lead on a modular jack-type telephone installation. The testing unit is substituted for the telephone handset when it is utilized.

A device which determines whether or not the voltages on the tip and ring line conductors are within their normal ranges is described in U.S. Pat. No. 4,051,333. The testing device is a tip and ring line conductor voltage tester which can utilize pre-existing circuit voltages as a source of power and which can be housed in test equipment normally utilized by a telephone installer or maintenance man (such as a handset).

There are disadvantages associated with each of the above-described testing devices. The test device of the '176 patent utilizes a separate test circuit to examine a specific telephone line characteristic. This necessitates the use of some control mechanism, e.g. a switch knob, in order to operate any specific test circuit. This, in turn, prevents the various characteristics of the telephone line to be tested in one operation. Secondly, in performing any of the particular tests, the customer's wiring and telephone instruments are disconnected when the selector knob is moved to a test circuit position. The '849 patent device, like the device of the '176 patent, has separate circuitry for each test, yet, unlike the '176 patent device, it performs simultaneous testing. However, the disclosed device is capable of testing only the polarity and voltage of the telephone line and, thus, has limited usefulness. In addition, the testing device is intended to substitute for a telephone handset during any testing; therefore, the particular telephone instrument becomes disconnected when the testing device is used.

The '333 patent discloses a testing device which is even more limited in scope than the devices of the first two patents because it can only perform one particular test, namely, a voltage test. Also, the disclosed testing device is intended to be used and installed in a telephone repairman handset which is not normally available or usable by an ordinary telephone customer. Note that other patents, such as, U.S. Pat. Nos. 3,729,597; 3,941,950; 4,227,055 and 4,413,163, relate generally to the subject matter of the invention. However, these patents are not believed to be pertinent to the invention disclosed herein.

SUMMARY OF THE INVENTION

The foregoing problems are obviated by the invention which is a telephone line testing device, comprising:

a. switching means for operably connecting the telephone line to the remainder of the testing device, the switching to make said connection actuating a testing cycle;

b. a plurality of detector elements which receive the telephone line signal from the switching means from which each element detects a characteristic of the telephone line different than the other detector elements; and c. means for indicating that each detector element has detected that the respective characteristic of the telephone line is in the correct operating range and has the correct operating status during a testing cycle.

Advantageously, the testing device of the invention allows a number of different telephone line characteristics to be checked in one simple operation. In a disclosed embodiment of the invention, the polarity, current draw and dial tone of the telephone line are checked via a single, same testing circuit. Secondly, the wiring and telephone instruments of the user do not have to be disconnected during the operation of the testing device. The testing device is installed as a replacement for the modular jack of a telephone instrument in the home and is hooked up in parallel to the normal telephone connection. Therefore no disconnection is anticipated by the use of the testing device.

BRIEF DESCRIPTION OF THE DRAWINGS

For a better understanding of the invention, reference is made to the following description of an exemplary embodiment thereof and to the accompanying drawings therein:

FIG. 2 is an electrical schematic diagram of the testing device of FIG. 1.

DETAILED DESCRIPTION

Figure 1:
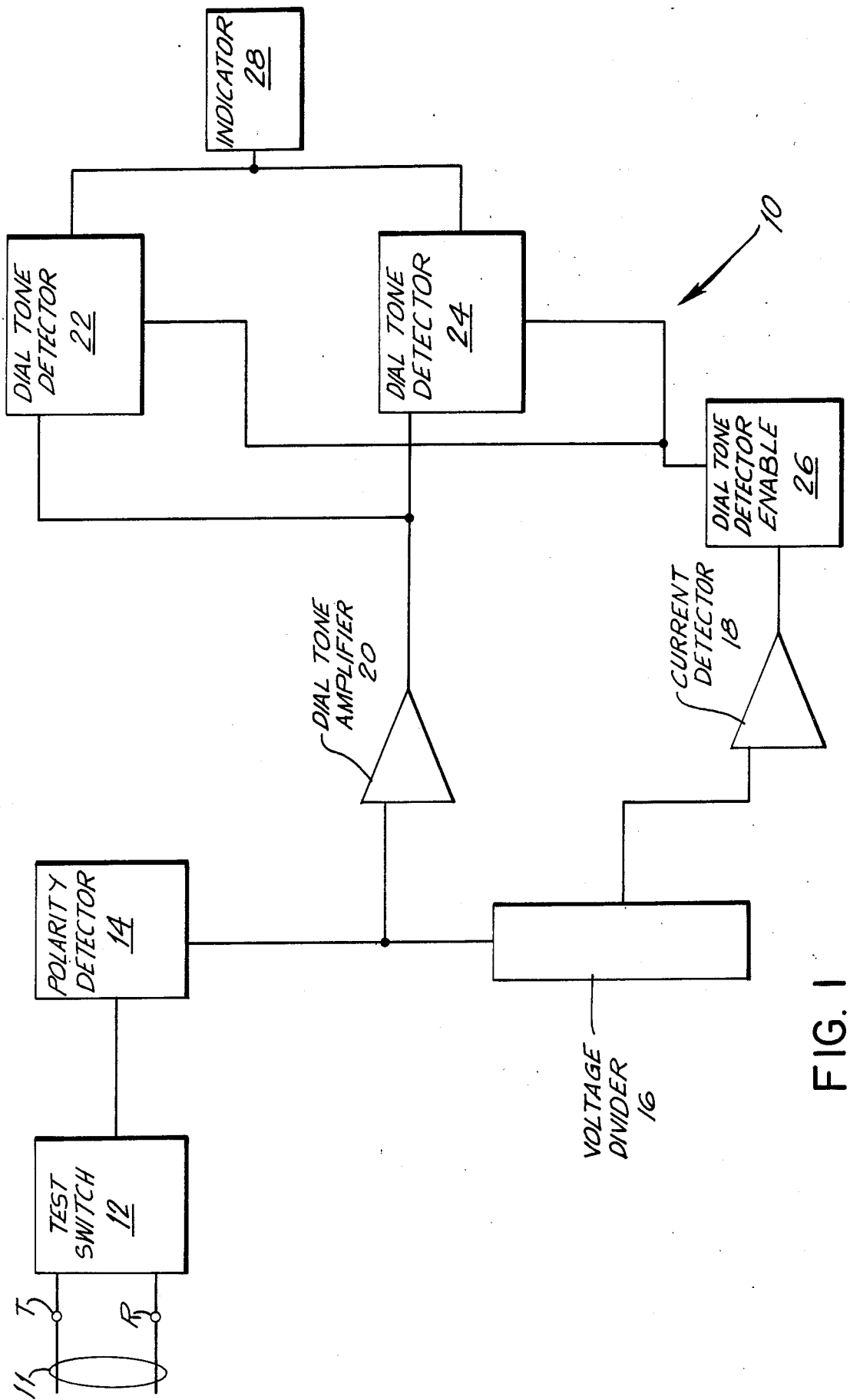
FIG. 1 is a block diagram of a testing device of the invention.

A block diagram of a telephone line testing circuit 10 is shown in FIG. 1. The tip and ring line terminals T,R of a telephone line 11 are coupled to the testing circuit 10 via a test switch 12. A polarity detector 14 is coupled to one pole of the test switch 12 in one of the tip and ring lines. The polarity detector 14 connects to a voltage divider element 16 which connects to the input of a current detector 18. The polarity detector 14 is also connected to the input of a dial tone amplifier 20 whose output feeds into the inputs of two dial tone detectors 22, 24. The two dial tone detectors 22, 24 each connect also to the output of a dial tone detector enable element 26. The output of the current detector 18 feeds into the input of the dial tone detector enable element 26. An indicator 28 receives the output of the two dial tone detectors 22, 24.

FIG. 2 illustrates an electrical schematic diagram of the telephone line testing circuit 10 of FIG. 1. The telephone line testing circuit 10 comprises a two pole test switch 32 having one pole 32a coupled to the tip line terminal T of the telephone line 11 and a second pole 32b coupled to the ring line terminal R of the telephone line 11. The cathode of a polarity detector diode 34, which may be of the 1N4004 type, is coupled to the first pole 32a of the test switch 32 in the tip line of the telephone line 11. Note that the diode 34 can be coupled to any one of the poles of the test switch 32 in either the ring or tip lines of the telephone line 11.

The anode of the polarity detector diode 34 is connected to one end of a resistor 36a which forms one-half of a voltage divider circuit further comprising a second resistor 36b connected to the other end of the first resistor 36a. The resistors are sized so that the entire testing circuit 10 "shows" an input impedance of approximately 430 ohms to the telephone line 11. The point between the two resistors of the voltage divider circuit is connected to a first input of a current detector 38 via an input resistor 38a. The first input also has connected thereto an input capacitor 38b, which is also tied to ground, as well as a feedback resistor 38c looping from the output of the current detector 38. A reference voltage generator circuit is connected to a second input of the current detector 38. The reference voltage generator circuit comprises a diode 37a whose anode is connected to ground, a series resistor 37b connecting the cathode of the diode 37a to the second input of the current detector 38, and a parallel resistor 37c connected between the second input and ground. The diode 37a can be a light-emitting diode or a Zener diode. Note also that the parallel resistor 37c may be eliminated without affecting the circuit's operation.

The anode of the polarity detector diode 34 is also connected to a first input of a dial tone amplifier 40 via a first coupling capacitor 40a and an input resistor 40b. Both the dial tone amplifier 40 and the current detector 38 are ordinary operational amplifiers which may be located on the same integrated circuit chip. A feedback resistor 40c is connected between the first input and the dial tone amplifier 40 output. A second input of the dial tone amplifier 40 is connected to the cathode of the diode 37a of the reference voltage generator circuit. Note that an isolating resistor 40d is connected between the anode of the polarity detector diode 34 and the second input of the dial tone amplifier 40.

The output of the dial tone amplifier 40 is connected, via a second coupling capacitor 40e, to the input ports (pins 3) of a low frequency dial tone detector 42 and a high frequency dial tone detector 44. The detectors 42, 44 are preferably low current frequency detectors, such as Model No. XRL567CP as manufactured by Exar Integrated Systems, Inc. of Sunnyvale, Calif. The TR port (pin 5) of each dial tone detector 42, 44 is connected to ground via a respective ground resistor 42a, 44a in series with a respective first ground capacitor 42b, 44b. The TC port (pin 6) of each dial tone detector 42, 44 is connected to the point between the respective ground resistor 42a, 44b and first ground capacitor 42b, 44b. The TR and TC ports (i.e., the timing resistor and timing capacitor ports) are utilized to set the frequency band of the detectors. The out filter ports (pins 1) of the dial tone detectors 42, 44 are both connected to ground via a second ground capacitor 45a. The loop filter ports (pins 2) of the dial tone detectors 42, 44 are both connected to ground via a third ground capacitor 45b.

The ground ports (pins 7) of the dial tone detectors 42, 44 are both connected to the collector of a transistor 46, which may be of the PN2222 type. The output of the current detector 38 feeds into the base of the transistor 46 via a base resistor 46a while the emitter of the transistor 46 is connected to ground. The transistor 46 acts as an enable element for the dial tone detectors 42, 44 by forming a ground path for the detectors when the transistor 46 becomes conductive.

The output ports (pins 8) of the dial tone detectors 42,44 are both connected to the anode of a light-emitting diode 48. The diode 48 has a base resistor 48a connected between the cathode of the diode 48 and a voltage source V for the testing circuit 10.

The anode of the polarity detector diode 34 is also connected, via a series resistor 47a, to the voltage source V which can be a voltage regulator. The voltage source V is tied to ground via a capacitor 47b and via a Zener diode 47c. Both the dial tone amplifier 40 and the current detector 38, as well as the dial tone detectors 42, 44 (at pin 4 of each), are energized by the voltage source V. Note that the ground capacitor 47b may be eliminated without affecting the circuit's operation.

In operation, the telephone customer/user depresses the test switch 32 to start a testing cycle. If the tip and ring lines of the telephone line 11 have the proper polarity at the telephone central office (i.e., the tip line being positive with respect to the ring line), then the polarity detector diode 34 will conduct. This allows current in the telephone line 11 to flow through the diode 34 to the remainder of the circuit. If the tip and ring lines have incorrect polarity, the polarity detector diode 34 will not conduct and no current will flow through the diode 34 causing the remainder of the testing circuit 10 to be inoperative. Incorrect polarity of the telephone line 11 thus prevents the light-emitting diode 48 from lighting up when the test switch 32 is depressed.

Assuming the polarity of the telephone line 11 is correct, then some current will flow through the diode 34 to the voltage divider circuit and a voltage will be generated at the first input (i.e., the +input) of the current detector 38. Note that the dial tone amplifier 40 does not receive current but does receive the dial tone signal, which passes through the diode 34, and outputs the dial tone in amplified form. If sufficient current is present on the telephone line 11 (at least 20 milliamperes) then the voltage generated at the first input of the current detector 38 will be greater than the reference voltage generated by the diode 37a at the second input (i.e., the −input) of the current detector 38. This causes the current detector 38 to output a signal to the base of the transistor 46. The transistor 46 then becomes conductive, forming a ground path for the two dial tone detectors 42, 44 which are then enabled. If insufficient current flows through the voltage divider circuit to the current detector 38, then the voltage at the first input will not be great enough to turn "on" the detector 38. Consequently, the remainder of the testing circuit 10 will be inoperative, i.e., the transistor 46 remains nonconductive and the dial tone detectors 42, 44 do not become enabled (Note, however, that the detectors continue to receive the dial tone signal from the amplifier 40 so long as the correct polarity exists). Insufficient current on the telephone line 11 thus prevents the light-emitting diode 48 from lighting up when the test switch 32 is depressed.

Assuming the current on the telephone line 11 is sufficient, then the current detector 38 feeds a signal to the transistor 46 base, the transistor 46 becomes conductive and the two dial tone detectors 42, 44 become enabled. The dial tone signal, in amplified form, is received from the polarity detector diode 34 at the input port (pin 3) of both detectors via the first coupling capacitor 40a, the dial tone amplifier 40 and the second coupling capacitor 40e (Note that the reference voltage generator circuit is not used in the operation of the dial tone amplifier 40). Since there are two types of dial tone used in the United States, two tone detectors 42, 44 are used. The low frequency dial tone detector 42 operates at 350 Hertz and the high frequency dial tone detector 44 operates at 600 Hertz. If either dial tone frequency is detected, the appropriate dial tone detector will generate an output signal which causes the light-emitting diode 48 to light up. If no dial tone exists on the telephone line 11 or if a dial tone with a frequency different than that which can be detected exists on the telephone line 11 then no output signal is generated. Incorrect dial tone frequency, or no dial tone, of the telephone line 11 thus prevents the light-emitting diode 48 from lighting up when the test switch 32 is depressed.

In summary, the telephone line testing circuit 10 tests for proper operating polarity, sufficient operating current and the existence of a dial tone of correct operating frequency utilizing the same circuitry in one simple operation. If improper polarity exists, the polarity detector diode 34 prevents a telephone line signal from reaching the rest of the circuit 10 so that the current detector 38 will be inoperable, the dial tone detectors 42, 44 will be disabled and the light-emitting diode 48 will not light up, thus indicating a fault on the telephone line 11. If the polarity is correct, but insufficient current is detected by the current detector 38, a dial tone signal will reach the dial tone detectors 42, 44 which remain disabled, and the light-emitting diode will remain off. If the polarity and the current are correct, a dial tone signal will reach the dial tone detectors 42, 44 which are now enabled, but the light-emitting diode 48 will only light up if a dial tone signal of the correct frequency is present on the telephone line 11.

Therefore, all three characteristics of the telephone line 11, polarity, current and dial tone, must be present and in the proper range before an indication is given by the light-emitting diode 48. Should a fault exist on the telephone line 11 affecting only one of the characteristics, the telephone line testing circuit 10 will indicate a fault regardless of the status of the other characteristics.

It is to be understood that the embodiments described herein are merely illustrative of the principles of the invention. Various modifications may be made thereto by persons skilled in the art without departing from the spirit and scope of the invention.

What is claimed is:

1. A telephone line testing device for determining whether a fault exists in a telephone line entering a user's premises or in the user's wiring and equipment, comprising:
    a. switching means for operably connecting the telephone line to the remainder of the testing device, the switching to make said connection actuating a testing cycle;
    b. a plurality of detector elements which receive the telephone line signal from the switching means from which each element detects a characteristic of the telephone line different than the other detector elements; and
    c. means for indicating that each detector element has detected that the respective characteristic of the telephone line is in the correct operating range and has the correct operating status during a testing cycle.

2. The telephone line testing device set forth in claim 1, wherein:
    the plurality of detector elements comprises (a) means for detecting the polarity of the telephone line, (b) means for detecting the current draw of the telephone line, and (c) means for detecting the dial tone of the telephone line.

3. The telephone line testing device set forth in claim 2, wherein:
    the means for indicating comprises means for indicating the detection of correct operating polarity, sufficient operating current draw and a dial tone of the correct operating frequency on the telephone line by the respective detecting means during a testing cycle.

4. The telephone line testing device set forth in claim 3, wherein:
    the means for detecting the current draw of the telephone line is inoperable when improper operating polarity of the telephone line is detected by the polarity detecting means.

5. The telephone line testing device set forth in claim 4, wherein:
    the means for detecting the dial tone of the telephone line is enabled when sufficient operating current draw on the telephone line is detected by the current draw detecting means.

6. The telephone line testing device sets forth in claim 5, wherein:
the indicating means generates a signal indicating that no fault exists in the telephone line entering the user's premises only when a dial tone of the correct operating frequency is detected by the dial tone detecting means.

7. The telephone line testing device set forth in claim 6, wherein:
the dial tone detecting means can detect a plurality of different correct operating frequencies of a dial tone on the telephone line.

8. The telephone line testing device set forth in claim 6, wherein:
the amount of sufficient operating current draw on the telephone line to enable the dial tone detecting means is at least 20 milliamperes.

9. A telephone line testing circuit for determining whether a fault exists in a telephone line entering a user's premises or in the user's wiring and equipment, comprising:
   a. a switch coupled to the tip and ring lines of the telephone line for operably connecting the lines to the remainder of the testing circuit, the switching of said switch actuating a testing cycle;
   b. means for detecting the polarity of the telephone line;
   c. means for detecting the current draw of the telephone line, said means being operable when correct operating polarity of the telephone line is detected by the polarity detecting means;
   d. means for detecting the dial tone of the telephone line, said means being enabled when sufficient operating current draw on the telephone line is detected by the current draw detecting means; and
   e. means for indicating the detection of correct operating polarity, sufficient operating current draw and a dial tone of correct operating frequency on the telephone line during a testing cycle by the respective detecting means, said means generating a signal indicating no fault exists in the telephone line only when a dial tone of the correct operating frequency is detected by the dial tone detecting means.

10. The telephone line testing circuit set forth in claim 9, wherein:
the dial tone detecting means can detect a plurality of different correct operating frequencies of a dial tone on the telephone line.

11. The telephone line testing circuit set forth in claim 9, wherein:
the amount of sufficient operating current draw on the telephone line to enable the dial tone detecting means is at least 20 milliamperes.

12. The telephone line testing circuit set forth in claim 9, wherein:
the polarity detecting means comprises a diode, coupled to one pole of the switch in one of the tip and ring lines of the telephone line, which becomes conductive and allows a telephone line signal to pass through to the remainder of the testing circuit when the telephone line has the correct operating polarity.

13. The telephone line testing circuit set forth in claim 9, wherein:
the current draw detecting means comprises:
   (a) a voltage divider element connected across the poles of the switch coupled to the tip and ring lines of the telephone line;
   (b) a reference voltage generating element;
   (c) a comparator element having a first input connected to the voltage divider element, a second input connected to the reference voltage generating element, and an output from which said comparator element generates an enabling signal to the dial tone detecting means when sufficient operating current draw, which produces a voltage at the first input greater than that of the reference voltage at the second input, is present on the telephone line.

14. The telephone line testing circuit set forth in claim 13, wherein:
the amount of sufficient operating current draw on the telephone line to enable the dial tone detecting means is at least 20 milliamperes.

15. The telephone line testing circuit set forth in claim 12, wherein:
the current draw detecting means comprises:
   (a) a voltage divider element connected across the poles of the switch coupled to the tip and ring lines of the telephone line and after the polarity detecting diode coupled to one of the poles;
   (b) a reference voltage generating element; and
   (c) a comparator element having a first input connected to the voltage divider element, a second input connected to the reference voltage generating element, and an output from which said comparator element generates an enabling signal to the dial tone detecting means when sufficient operating current draw, which produces a voltage at the first input greater than that of the reference voltage at the second input, is present on the telephone line.

16. The telephone line testing circuit set forth in claim 15, wherein:
the amount of sufficient operating current draw on the telephone line to enable the dial tone detecting means is at least 20 milliamperes.

17. The telephone line testing circuit set forth in claim 9, wherein:
the dial tone detecting means comprises:
   (a) dial tone amplifying means for receiving and amplifying the dial tone of the telephone line;
   (b) a plurality of dial tone detecting elements which receive the dial tone of the telephone line from the dial tone amplifying means, each element respectively detecting a different correct operating frequency of the dial tone; and
   (c) means for enabling the plurality of dial tone detecting elements when sufficient operating current draw on the telephone line is detected by the current draw detecting means.

18. The telephone line testing circuit set forth in claim 15, wherein:
the dial tone detecting means comprises:
(a) dial tone amplifying means for receiving and amplifying the dial tone of the telephone line;
(b) a plurality of dial tone detecting elements having inputs to receive the dial tone of the telephone line from the dial tone amplifying means and outputs to transmit a signal to the indicating means when a dial tone of the correct operating frequency is detected, each element respectively detecting a different correct operating frequency of the dial tone; and (c) means for enabling the plurality of dial tone detecting elements when the comparator element of the current draw detecting means generates an enabling signal.

19. The telephone line testing circuit set forth in claim 18, wherein:

the dial tone amplifying means comprises a comparator element having a first input capacitively connected to the polarity detecting diode, a second input connected to the reference voltage generating element of the current draw detecting means, and an output from which said comparator element transmits the dial tone of the telephone line, in amplified form, to the dial tone detecting elements so long as the correct operating polarity of the telephone line is detected by the polarity detecting diode.

20. The telephone line testing circuit set forth in claim 19, wherein:

the means for enabling comprises a transistor having a base connected to the output of the comparator element of the current draw detecting means, a collector connected to each dial tone detecting element and an emitter connected to ground, said transistor becoming conductive and enabling the dial tone detecting elements upon receiving an enabling signal at the base from the comparator element of the current draw detecting means.

21. The telephone line testing circuit set forth in claim 9, wherein:

the indicating means comprises a light-emitting diode connected to the dial tone detecting means.

22. The telephone line testing circuit set forth in claim 18, wherein:

the indicating means comprises a light-emitting diode which is connected to the outputs of the dial tone detecting elements of the dial tone detecting means and which generates a signal indicating no fault exists in the telephone line when a signal is received from any one of the dial tone detecting elements.

23. A telephone line testing circuit for determining whether a fault exists in a telephone line entering a user's premises or in the user's wiring and equipment, comprising:

(a) a two pole test switch coupled to the tip and ring lines of the telephone line for operably connecting the lines to the remainder of the testing circuit and actuating a testing cycle upon being switched;

(b) a diode, coupled to one pole of the test switch in one of the lines of the telephone line, which becomes conductive to allow a telephone line signal to pass to the remainder of the circuit when the telephone line has the correct operating polarity;

(c) a current draw detecting circuit comprising a voltage divider circuit connected across the two switch poles coupled to the tip and ring lines of the telephone line and after the diode coupled to one of the poles, a reference voltage generating circuit and a comparator having a first input connected to the voltage divider circuit, a second input connected to the reference voltage generating circuit and an output which supplies a signal when sufficient operating current draw on the telephone line produces a voltage at the first input greater than the voltage at the second input, said circuit operable only when the diode is conductive and allows the telephone line signal to pass;

(d) a dial tone detecting circuit comprising an amplifier having a first input, capacitively connected to the diode, to receive the dial tone of the telephone line, a second input connected to the reference voltage generating circuit and an output to transmit the dial tone in amplified form so long as the diode is conductive, a plurality of frequency detectors having respective inputs to receive the dial tone from the amplifier output and respective outputs to transmit a signal upon the detection of a dial tone with a correct operating frequency, each detector respectively detecting a different correct operating frequency of the dial tone; and a transistor having a base connected to the comparator output, a collector connected to each frequency detector and an emitter tied to ground, said transistor becoming conductive and enabling the frequency detectors upon receiving a signal from the comparator output; and (e) a light-emitting diode, connected to the outputs of the frequency detectors, which signals that the entering telephone line has correct operating polarity, sufficient operating current draw and a dial tone of correct operating frequency by emitting a signal, upon the switching of the test switch, when any one of the frequency detectors transmits an output signal.

24. The telephone line testing circuit set forth in claim 23, wherein:

the reference voltage generating circuit comprises a light-emitting diode.

25. The telephone line testing circuit set forth in claim 23, wherein:

the reference voltage generating circuit comprises a Zener diode.

26. A method for detecting whether a fault exists in a telephone line entering a user's premises or in a user's wiring and equipment, comprising the steps of:

(a) connecting the telephone line to a telephone line testing circuit;

(b) detecting the polarity of the telephone line by the testing circuit;

(c) detecting the current draw of the telephone line by the testing circuit;

(d) detecting the frequency of the dial tone of the telephone line by the testing circuit; and (e) indicating that the telephone line has correct operating polarity, sufficient operating current draw and a dial tone of correct operating frequency upon connecting the telephone line to the testing circuit.

27. A method for determining whether a fault exists in a telephone line entering a user's premises or in a user's wiring and equipment, comprising the steps of:

sequentially testing, via a telephone line testing circuit, the polarity, the current draw, and the dial tone of the telephone line and indicating, via signal means in the circuit, that an operational telephone line is entering the premises only if all three characteristics of the entering telephone line are correct and in the proper operational range.

* * * * *